(12) United States Patent
Finona et al.

(10) Patent No.: US 7,029,184 B2
(45) Date of Patent: Apr. 18, 2006

(54) FIBER OPTIC STRAIN RELIEF

(75) Inventors: Michael Santos Finona, Fountain Valley, CA (US); Douglas Reid Gastineau, Costa Mesa, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 546 days.

(21) Appl. No.: 10/340,472

(22) Filed: Jan. 10, 2003

(65) Prior Publication Data

US 2004/0135737 A1 Jul. 15, 2004

(51) Int. Cl.
*G02B 6/36* (2006.01)

(52) U.S. Cl. .......................... 385/86; 385/78
(58) Field of Classification Search .................. 385/78, 385/86
See application file for complete search history.

(56) References Cited

U.S. PATENT DOCUMENTS

| | | | | |
|---|---|---|---|---|
| 4,047,797 A | 9/1977 | Arnold et al. | ................ | 350/96 |
| 4,319,802 A | 3/1982 | Bowes | ................ | 350/96.2 |
| 4,406,515 A | 9/1983 | Roberts | ................ | 350/96.21 |
| 4,611,887 A | 9/1986 | Glover et al. | ................ | 350/96.21 |
| 4,687,291 A | 8/1987 | Stape et al. | ................ | 350/96.21 |
| 4,787,706 A * | 11/1988 | Cannon et al. | ................ | 385/59 |
| 4,804,252 A | 2/1989 | Betzler et al. | ................ | 350/96.23 |
| 4,815,810 A | 3/1989 | Betzler et al. | ................ | 350/96.2 |
| 4,834,489 A | 5/1989 | Betzler et al. | ................ | 350/96.2 |
| 5,067,784 A | 11/1991 | Debortoli et al. | ................ | 385/53 |
| 5,134,677 A | 7/1992 | Leung et al. | ................ | 385/84 |
| 5,140,661 A | 8/1992 | Kerek | ................ | 385/81 |
| 5,418,874 A | 5/1995 | Carlisle et al. | ................ | 385/76 |
| 5,475,782 A | 12/1995 | Ziebol | ................ | 385/87 |
| RE35,935 E | 10/1998 | Cabato et al. | ................ | 385/87 |
| 6,491,445 B1 * | 12/2002 | Abendschein | ................ | 385/87 |
| 6,722,789 B1 * | 4/2004 | Hyzin et al. | ................ | 385/78 |
| 2002/0150348 A1 * | 10/2002 | Nguyen | ................ | 385/59 |

* cited by examiner

*Primary Examiner*—Michelle Connelly-Cushwa
*Assistant Examiner*—Rhonda S. Peace
(74) *Attorney, Agent, or Firm*—Peter Van Winkle

(57) ABSTRACT

An optical fiber connector includes a housing (12) with a terminus-holding housing (14) portion that holds a plurality of optical fiber termini (24) with optical cables trailing therefrom. A pair of metal sleeves are crimped to the strength member of each optical cable to form a crimp sleeve assembly (26). The housing including a holder (16) with a plurality of channels (32) that each removably holds one of the sleeve assemblies. This arrangement enables a selected one of a plurality of optical fiber cables with termini fixed thereto, to be easily removed from the rest of the housing, and to allow a new optical fiber cable with a terminus and crimp sleeve assembly thereon to be installed in its place.

12 Claims, 3 Drawing Sheets

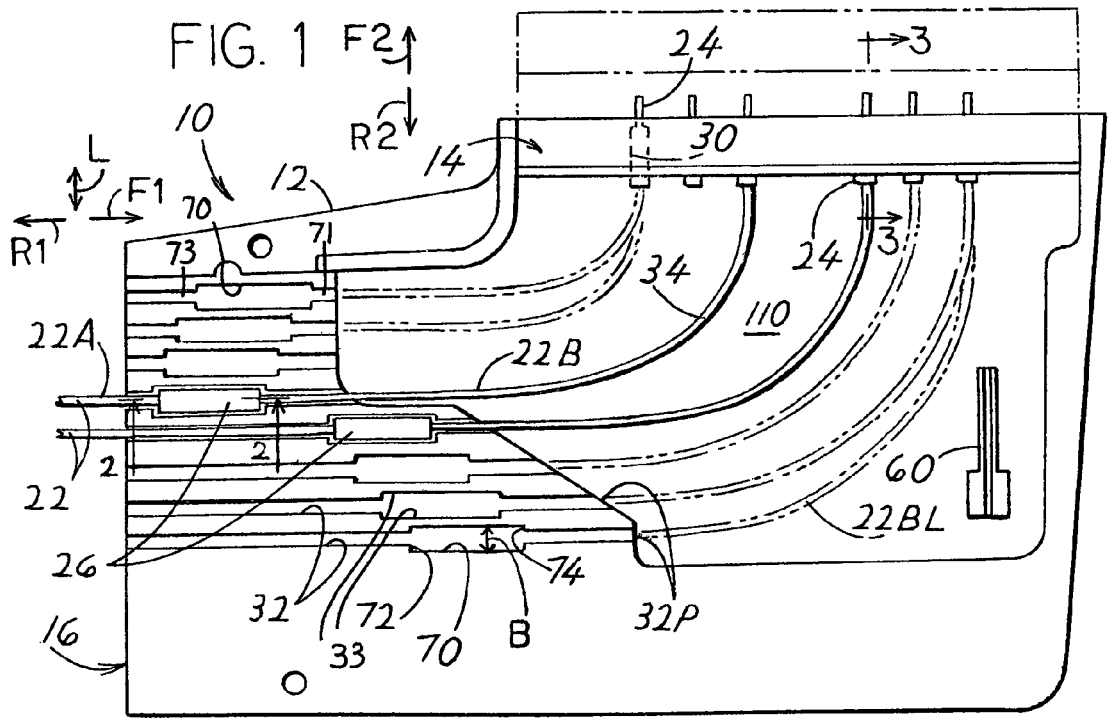
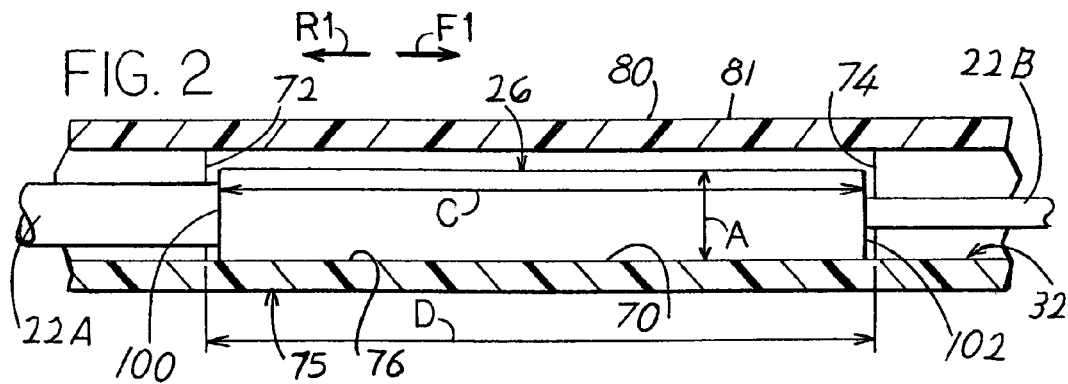
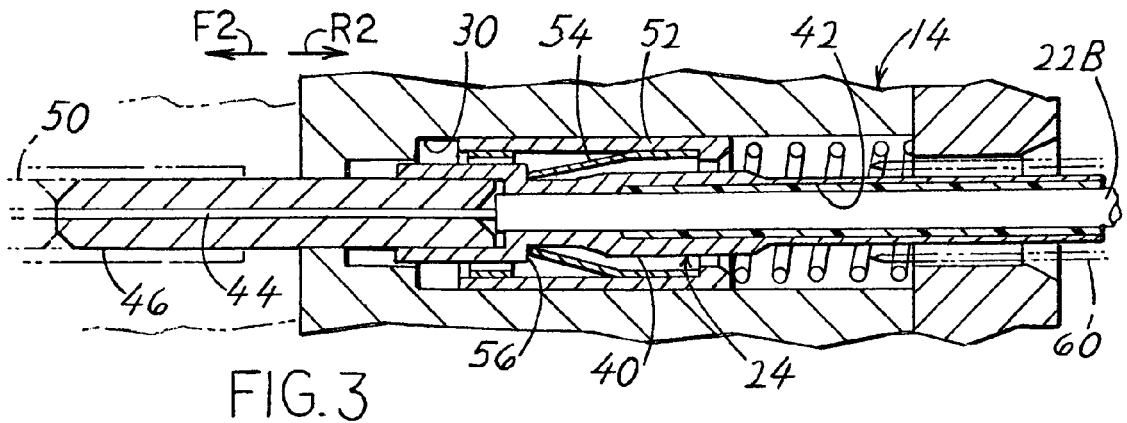

FIBER OPTIC STRAIN RELIEF

BACKGROUND OF THE INVENTION

An optical fiber connector commonly includes a housing with a plurality of terminus-holding passages and a plurality of termini each lying in one of the passages and held therein by a releaseable clip. An optical cable trails behind each terminus, and the optical cables are commonly bundled, that is, fixed together to a cable holder that is fixed to the housing. Pulling forces applied to any cable are transferred to the holder rather than to a terminus. One way for fixing all cables to a holder is to wrap a strap tightly around the cables and holder to hold them all together, and to fix the holder to a post extending from the terminus-holding housing portion. If it is desired to remove a terminus, the strap that holds the cables together is cut to free the cable, a removal tool is inserted around a terminus to release it from a clip, and the cable is removed. The need to cut a strap that holds the cables together, is inconvenient because all of a group of cables are released and another strap must be found to encircle all cables again to hold them to the cable holder. If the band is not very tightly wrapped around the cables it will not prevent them from sliding along the holder when a cable is pulled. Such sliding could cause large pulling forces on the terminus and damage it. A holder that even more securely held each cable against pulling forces to prevent such pulling forces from being transmitted to the terminus, but which enabled easy removal of a cable and replacement by another cable with a terminus at its end, would be of value.

SUMMARY OF THE INVENTION

In accordance with one embodiment of the present invention, an optical fiber connector is provided, which can mount optical cables extending from termini so the optical cables are securely held against pulling forces and yet each individual optical cable can be readily removed along with its terminus and replaced. The connector includes a terminus-holding housing portion with passages that hold termini, a plurality of pairs of crimp sleeves that are crimped to cable locations spaced more than a centimeter behind the termini to form crimp sleeve assemblies thereat, and a holder. The holder has a plurality of channels for receiving the crimp sleeve assemblies. The channels have shoulders that prevent a crimp sleeve assembly from moving rearward when a cable is pulled, while allowing the cable with terminus and crimp sleeve assembly to be purposely removed and replaced with ease. Each pair of crimp sleeves is crimped around a strength member of a cable, to transmit tension forces applied to a rearward portion of the cable, through the strength member to the crimp sleeves.

The novel features of the invention are set forth with particularity in the appended claims. The invention will be best understood from the following description when read in conjunction with the accompanying drawings.

BRIEF DESCRIPTION OF THE DRAWINGS

FIG. 1 is a plan view of an optical fiber connector of one embodiment of the present invention, including a plurality of optical fibers that have crimp sleeve assemblies thereon and that are connected to termini.

FIG. 2 is a sectional view taken on line 2—2 of FIG. 1, and with a cover lying over the holder.

FIG. 3 is a sectional view taken on line 3—3 of FIG. 1.

DESCRIPTION OF THE PREFERRED EMBODIMENTS

Figure 4:
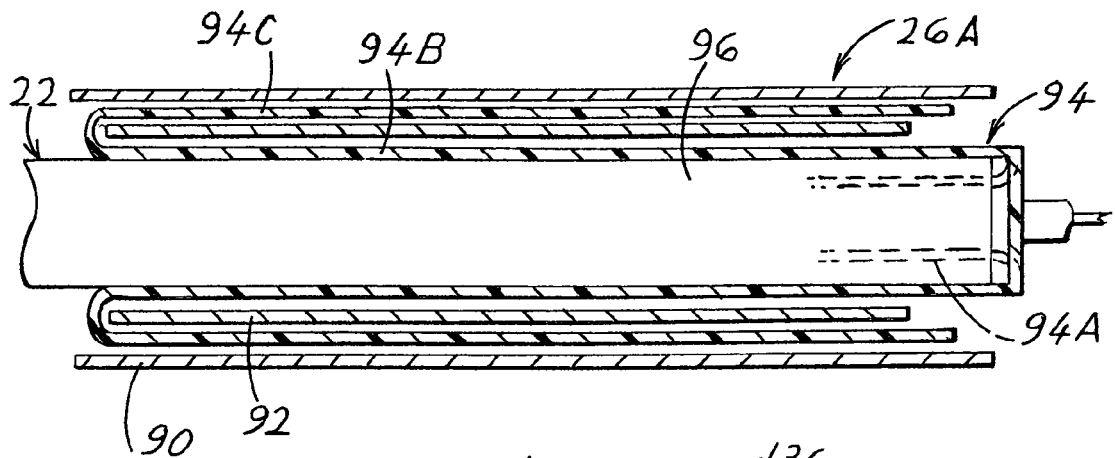
FIG. 4 is a sectional view of the crimp sleeve assembly of FIG. 2, with the crimp sleeves and strength member shown slightly spaced apart, and in a position prior to crimping.

FIG. 1 illustrates an optical fiber connector 10 which includes a housing 12 with a terminus-holding portion 14 and a holder 16. A plurality of optical fiber cables 22 are shown mounted in the connector, each cable having a front end fixed to an optical fiber terminus 24 and having another portion crimped to a pair of sleeves to form a crimp sleeve assembly 26. Each terminus 24 lies in a terminus-holding passage 30 of housing portion 14. Each crimp assembly 26 lies in a channel 32 of the holder. In the connector of FIG. 1, all optical fiber cables undergo a 90° bend such as at 34. Front and rear directions for each terminus and the corresponding housing portion 14 are indicated by arrows F2, R2. Forward and rearward directions for the channels 32 and the cable portions lying therein, are indicated by arrows F1 and R1.

FIG. 3 shows a terminus 24 lying in one the passages 30 of the terminus-receiving housing portion 14. The terminus includes a body 40 with a bore 42. The optic fiber cable (from which the strength member and jacket have been removed at the front) includes a buffered fiber portion 22B. The fiber portion 22B extends through the bore and a held by epoxy therein. The fiber portion and has a fiber 44 extending through a ferrule 46 to the tip of the ferrule, and that abuts the tip of another fiber at the tip of a mating terminus 50. A retention clip device 52 with a retention clip 54, abuts a rearwardly-facing surface 56 on the terminus to prevent rearward pullout of the terminus. It is possible to provide a single plate with groups of slits that form a clip device at each passage. However, a tool 60 with a slot in it, can be inserted through the passage to expand the clip 54, so the tool and terminus can be pulled rearwardly out of the passage 30, all in a known manner. FIG. 1 shows a tool 60. A free space must be left around each optical cable behind the termini 24, to allow the tool to be inserted to remove a selected one of the fibers.

As described above, any pulling forces on the cable 22, at a location rearward R1 of the holder 16, is taken up by a crimp sleeve assembly 26 that is crimped to the cable. The channels 32 have enlarged channel portions 70 in which the crimp sleeve assemblies lie. Channel parts 71, 73 lie immediately forward and rearward of each enlarged channel portion. Each enlarged channel portion has a pair of shoulder 72, 74 at its opposite ends, that prevent the crimp sleeve assembly 26 from sliding forwardly or rearwardly along the channel. Actually, the main forces to be resisted are pulling forces on the trailing parts of the cable 22 that extend rearwardly of the holder, which are borne by the rearward shoulders 72.

FIG. 2 shows that the holder includes a lower portion 75 that forms each channel bottom wall 76 and opposite channel side walls 33 (FIG. 1) of each channel. The holder also includes a cover 80 (FIG. 2) that forms a top wall 81 that restricts removal of a crimp sleeve assembly 26 through the top of the channel. while allowing such removal by first removing the cover from the holder lower portion 75. When the crimp assembly is removed it is removed in a direction that is perpendicular to the forward and rearward directions F1, R1 along which the channel parts 71, 73 are spaced. FIG. 2 shows a crimp sleeve assembly 26 lying in an enlarged channel portion 70 of a channel 32. The sleeve assembly has a larger diameter A than the width B of a channel. It is noted that the cross-section of the crimp may be hexagonal, round, or of other shape, and its cross-sectional width is herein referred to as its diameter. As a result, the ends of the sleeve assembly can abut the ends or shoulders 72, 74 of the enlarged channel portion 70. The crimp sleeve assembly has a length C that is slightly less than the length D of the channel. The crimp sleeve assembly 26 cannot move more than a limited amount forward or rearward within the enlarged channel portion 70. A cover 80 prevents loss of the sleeve assembly and cable 22, unless the cover is removed. The cover also covers the bends 34 (FIG. 1) in the cables. Application has built and successfully tested a connector of the type illustrated in FIG. 1, with optical cables having a jacket outside diameter of 0.035 inch and a crimp sleeve assembly length of 0.425 inch.

FIG. 4 shows the construction of the crimp sleeve assembly at 26A prior to actual crimping. The crimp sleeve assembly includes outer and inner metal sleeves 90, 92. The cable 22 includes a strength member 94 with an internal portion 94A that lies within an outer jacket 96 of the cable. A length of the outer jacket has been stripped away, so the uncovered portion of the strength member 94 can be folded backward at 94B. Then, a portion 94C of the strength member can be folded forward again around the inner sleeve 92, and the outer sleeve 90 can be slid around the strength member portion 94C. The assembly 26A is then crimped to hold the parts firmly together. The crimping can be along the entire length of the inner and outer sleeves 90, 92, which provides secure holding of the sleeves to the strength member of the cable. It is also possible to crimp only selected locations along the length of the sleeves. The final crimp sleeve assembly is shown at 26 in FIG. 2, and its ends 100, 102 are of sufficient diameter to prevent rearward pullout of the crimp sleeve assembly from the enlarged channel portion 70.

To assemble the connector of FIG. 1, the metal sleeves are installed around the cables with striped ends, the termini are attached to the front ends of the cables as shown in FIG. 3, and the metal sleeves are each crimped to the strength member of a cable as indicated in FIG. 4. Each terminus is inserted into one of the passages 30 (FIG. 1) and is held in place by the corresponding clip. The front cable portion 22B extends in a curve that includes a bend 34. The crimp sleeve assembly 26 is placed in a corresponding enlarged channel portion 70 and with the rest of the cable extending through the rest of the channel. The jacketed cable portion 22A extends out of the connector.

Because of the large space 110 provided for the front cable portions 22B, the person who attaches the crimp sleeve assembly 26 to a cable, does not have to provide an exact distance between the terminus 24 and the crimp sleeve assembly 26. The person only has to provide a sufficient length of front cable portion 22B to allow for a gradual bend. An excessive length of the cable portion 22B can be accommodated in the space 110. The channels have proximal ends 32P that are ends closest to the terminus-receiving passages 30. The channels 32 and their proximal ends all lie to one side (in direction R1) of an imaginary rearward (R2) extensions of the terminus-receiving passages, to leave the wide space 110. It is noted that the enlargements at 70 are staggered to reduce the require length of cable portions 22B for the furthest passages.

If one of the termini 24 is not operating properly, the cover 80 is lifted and the terminus is removed from a passage 30 using the tool 60. The cable is removed from the housing 12 by merely lifting the corresponding crimp sleeve assembly 26 from the enlarged portion of the corresponding chanel. A replacement cable with a terminus attached thereto can be easily installed. A spare cable can be constructed with its crimp sleeve assembly spaced as though it were to be used for the longest front cable portion 22BL, and it can be used for any other cable position.

The sleeve assemblies illustrated, each have sleeves that lie within and around the strength member of the cable and that are crimped to the strength member. Any other way of fixing a sleeve or the like to the cable, in a manner that results in the sleeve or the like having a greater diameter (width) than the cable to allow the sleeve to transfer pulling forces on the cable to a shoulder on a holder channel, will be useful.

Figure 5:
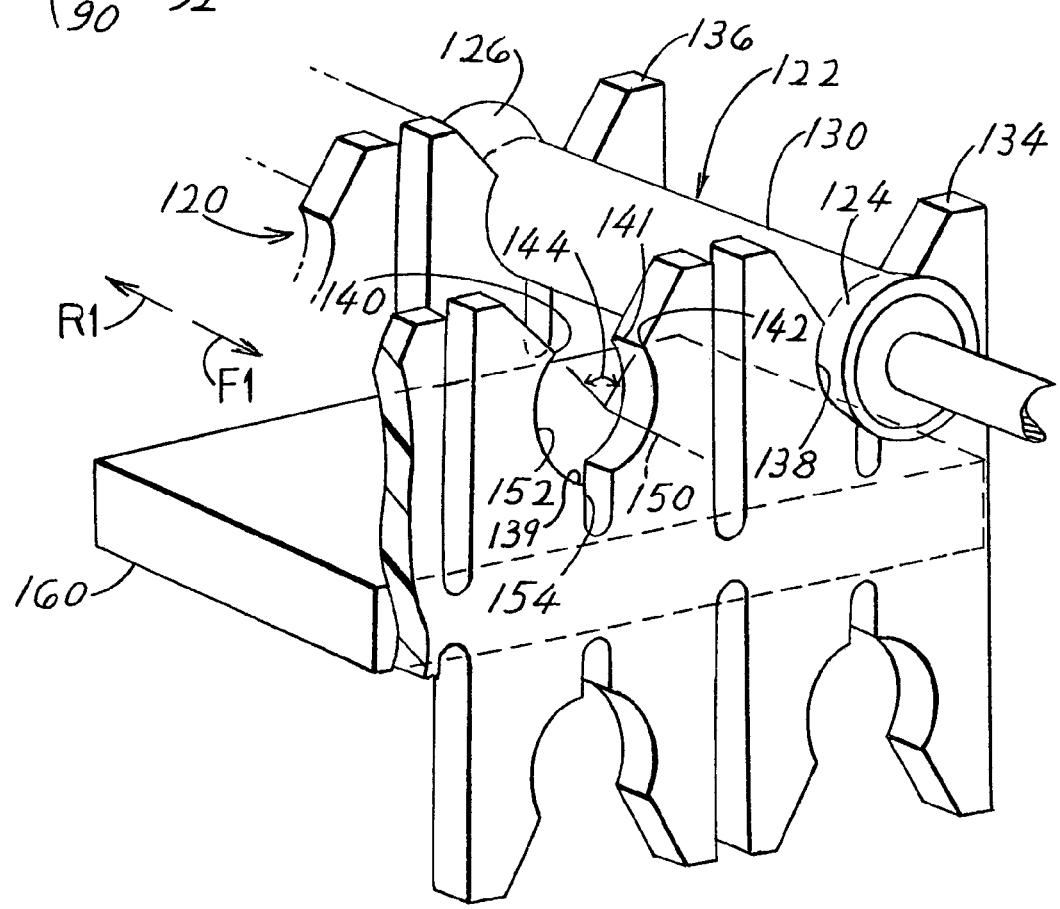
FIG. 5 is a partial isometric view of a holder of another embodiment of the present invention.

FIG. 5 illustrates another cable holder 120 which holds a crimp sleeve assembly 122 of a different shape. The crimp sleeve assembly has ends 124, 126 of larger diameters than a middle portion 130. The holder has walls 134, 136 that form an interrupted channel 152 with side walls at 138 that form channel surfaces that engage end portions of the reduced-diameter middle portion 130 of the sleeve assembly. The interrupted channel also forms a bottom 139 and a top at 140, 141. The walls 134, 136 substantially abut the enlarged ends 124, 126 to prevent the sleeve assembly 122 from being pulled rearwardly R1 or sliding forwardly F1. Each wall 134, 136 of the holder has laterally L opposite sides at 138 that encircle the middle portion 130. An opening 141 has sides 140, 142 that are angularly spaced at an opening angle 144 must be spread apart to install or remove a sleeve assembly along a direction perpendicular to the directions R1, F1. The two side locations 140, 142 are angled apart by an angle 144 of about 90° about the axis 150 of the interrupted channel 152 formed by the walls 134, 136. The material of the walls 134, 136 can be resiliently deflected, and slots 154 facilitates such deflection. However, the crimp sleeve assembly 122 cannot be removed unless considerable upward force is applied to the crimp sleeve assembly to pull it up from the channel 152. It is noted that the front and rear channel walls 134, 136 are fixed together by a beam 160.

Figure 6:
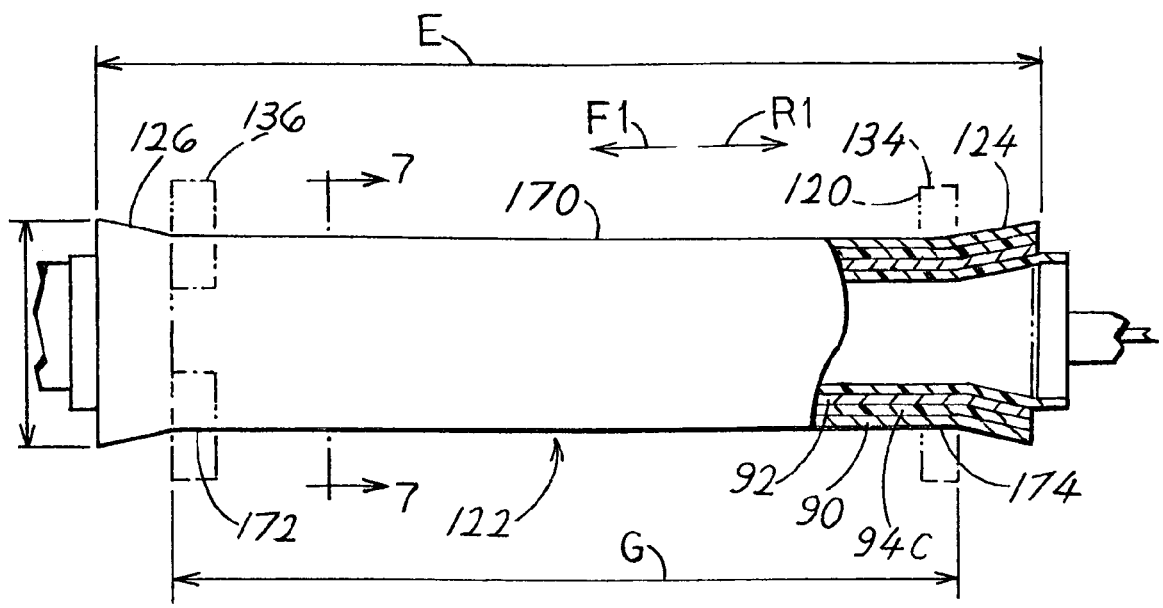
FIG. 6 is a side elevation view, partially in section, of a crimp sleeve assembly with flared or bellmouth ends, of the type shown in FIG. 5.
Figure 7:
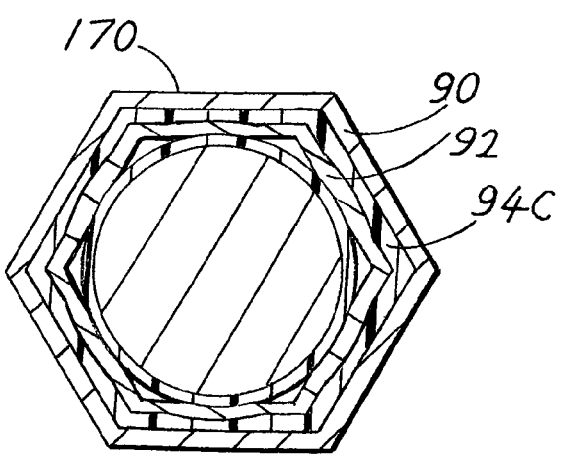
FIG. 7 is a sectional view taken on line 7—7 of FIG. 6.

FIG. 6 shows the manner in which the crimp sleeve assembly 122 is formed. The initial crimp sleeve assembly is similar to the crimp sleeve assembly shown at 26A in FIG. 4. However, during crimping, only a middle length 170 is crimped. This leaves the opposite ends 124, 126 of larger diameter. The particular crimp sleeve assembly 122 has gradual enlargements, or bellmouths, its opposite ends. Since the opposite walls of the holder 120 engage only end portions 172, 174 of the middle length 170, it is also possible to crimp only the portions at 172 and 174, although applicant prefers to crimp the entire middle length 170, which provides a more secure holding of the outer and inner sleeves 90, 92 to the strength member portion 94C. The distance E between opposite ends of the crimp sleeve assembly is greater than the distance G between opposite end of the interrupted channel portion in which the assembly lies. FIG. 7 shows that the crimping operation actually deforms the sleeves into a hexagon shape, although any shape can be used that results in a reduced width, or diameter of the sleeves.

Thus, the invention provides apparatus for strain relief holding of an optical fiber cable which provides very secure holding, especially against pulling of the rear portion of the cable, and which facilitates easy removal of an individual one of a plurality of terminated cables and replacement of the removed cable. The invention also provides an optical fiber connector which includes a holder with a channel that receives at least part of a sleeve assembly lying along a cable, and that provides a large space between the holder and the termini at the front ends of the cables, to accommodate different degrees of bending of cables portions of different lengths between the terminus and holder channel and to provide room for an extraction tool. Each sleeve assembly, which is preferably a crimp sleeve assembly, is securely fastened to the strength member of the optical fiber cable. This is preferably accomplished by the use of inner and outer metal sleeves, with the strength member of the cable trapped between the sleeves and the sleeves crimped to hold to the strength member and to hold to the outside of the cable jacket. Each channel of the holder has a channel portion that closely holds the crimp sleeve assembly to prevent axial movement of it. One holder has a plurality of channels that each has an enlarged channel portion that holds a crimp sleeve assembly, the enlargement forming opposite ends with shoulders that can abut front and rear ends of the crimp sleeve assembly. The cable with the crimp sleeve assembly can be merely moved up out of the channel, when a cover is not present. Another crimp sleeve assembly has enlarged front and rear ends and lies in an interrupted channel. The walls of the channel receive the smaller diameter middle portion and engage the enlarged ends of the crimp sleeve assembly, to prevent forward and rearward movement of the cable.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use with each of a plurality of optical fiber cables that each includes a strength member, an outer cable jacket lying around the strength member, and a buffered fiber that extends to one of a plurality of termini for optically coupling to a mating terminus device, comprising:
   a plurality of crimp sleeve assemblies that are each crimped to a location on one of said strength members of a cable and that lies around the jacket of the cable, each of said buffered fibers having a portion extending from a corresponding one of said locations to a corresponding one of said termini;
   a holder that has channel walls forming a plurality of elongated channels that each has channel bottom and side walls that each holds a single one of said crimp sleeve assemblies to prevent at least rearward movement of the assembly, said channel walls also forming a top wall along each channel through which removal of the crimp sleeve assembly is restricted but through which the crimp sleeve assembly can be removed in a direction perpendicular to the length of said elongated channel, whereby a selected one of said optical fiber cables can be easily removed, together with its terminus, from the rest of the cables and corresponding termini.

2. The apparatus described in claim 1 wherein:
said holder includes a holder lower portion that forms said channel bottom and side walls, and a cover that forms said channel top walls, with said cover being removeable from said holder lower portion to allow removal of a crimp sleeve assembly.

3. The apparatus described in claim 1 wherein:
said holder top wall has openings that are each narrower than said crimp sleeve assembly, but each opening has opposite sides that are resiliently moveable apart to pass the crimp sleeve assembly therethrough when the crimp sleeve assembly is forcefully raised.

4. The apparatus described in claim 1 including:
an optic fiber connector comprising a housing that includes a terminus-holding housing portion having a plurality of terminus-receiving passages and a retention clip device within each passage, each retention clip device being operable by a forwardly-inserted tool to release a corresponding terminus so it can be pulled rearwardly out of the passage;
said housing also includes a holder portion that forms said holder, said holder portion spaced sufficiently from said terminus-holding housing portion to enable the reception of said tool.

5. An optical fiber connector that comprises a housing that includes a terminus-holding housing part having a plurality of terminus-receiving passages and a retention clip device within each passage each retention clip device being expandable by a forwardly-inserted tool to release a corresponding terminus so it can be pulled rearwardly out of the passage, the connector also comprising a plurality of termini assemblies that each includes an optic fiber cable that has a fiber, where part of the length of the fiber is surrounded by a strength member that is surrounded by a jacket, the fiber having a front end, the terminus having a bore through which the fiber extends, and the terminus being retained in one of said terminus-receiving passages by one of said retention clip devices, but being removable from the rear of the terminus-holding housing portion, including:
   a sleeve assembly lying along each of said cables, each sleeve assembly including a sleeve lying around and fixed to said strength member;
   said housing includes a holder that has channel walls forming a plurality of individual channels that each includes a channel holding portion that is elongated in forward and rearward directions and that holds one of said sleeve assemblies and that each includes adjacent channel parts that lie respectively forward and rearward of said channel holding portion, said channel portions each forming channel shoulders that substantially abut said sleeve assemblies to limit at least their rearward movement along the channel;
   said holder including means for allowing restricted removal of a crimp sleeve assembly in a direction perpendicular to said forward and rearward directions, to allow a selected one of said optical fiber cables and its terminus be easily replaced.

6. Apparatus for use with each of a plurality of optical fiber cables that each includes a strength member, an outer cable jacket lying around the strength member, and a buffered fiber that extends to one of a plurality of termini for optically coupling to a mating terminus device, comprising
   a plurality of crimp sleeve assemblies that are each crimped to a location on one of said strength members of a cable and that lies around the jacket of the cable, each of said buffered fibers having a portion extending from a corresponding one of said locations to a corresponding one of said termini;
   a holder that has channel walls forming a plurality of channels that each removably holds a single one of said crimp sleeve assemblies to prevent at least rearward movement of the assembly, whereby a selected one of said optical fiber cables can be easily removed, together with its terminus, from the rest of the cables and corresponding termini;

said crimp sleeve assemblies each have a predetermined sleeve length and have opposite sleeve ends;

said channels each have a channel length greater than said sleeve length and have channel opposite ends;

each of said crimp sleeve assemblies includes a pair of metal sleeves lying one within the other and with a cable strength member between them, the metal sleeves having front and rear opposite ends and being crimped along their lengths;

each crimp sleeve assembly lies in one of said channels with its opposite sleeve ends adjacent to the channel opposite ends to prevent the crimp sleeve assembly from sliding forward or rearward out of the channel.

7. Apparatus for use with each of a plurality of optical fiber cables that each includes a strength member, an outer cable jacket lying around the strength member, and a buffered fiber that extends to one of a plurality of termini for optically coupling to a mating terminus device, comprising a plurality of crimp sleeve assemblies that are each crimped to a location on one of said strength members of a cable and that lies around the jacket of the cable, each of said buffered fibers having a portion extending from a corresponding one of said locations to a corresponding one of said termini;

a holder that has channel walls forming a plurality of channels that each removably holds a single one of said crimp sleeve assemblies to prevent at least rearward movement of the assembly, whereby a selected one of said optical fiber cables can be easily removed, together with its terminus, from the rest of the cables and corresponding termini;

said crimp sleeve assemblies each have a predetermined sleeve length;

said channels each have a channel length less than said sleeve length and have channel opposite ends;

each of said crimp sleeve assemblies includes a pair of metal sleeves lying one within the other and with a cable strength member between them, the metal sleeves having front and rear sleeve opposite ends and a middle length between said sleeve ends, at least portions of said middle length being fully crimped but said sleeve opposite ends not being fully crimped, to leave said sleeve ends with enlarged diameters;

said crimp sleeve assemblies each lies with its middle length at least partially in one of said channels and its opposite sleeve ends lying beyond said front and rear opposite ends of the channel, the channel opposite ends preventing the crimp sleeve assemblies from sliding forward or rearward out of the channel.

8. Apparatus for use with each of a plurality of optical fiber cables that each includes a strength member, an outer cable jacket lying around the strength member, and a buffered fiber that extends to one of a plurality of termini for optically coupling to a mating terminus device, comprising a plurality of crimp sleeve assemblies that are each crimped to a location on one of said strength members of a cable and that lies around the jacket of the cable, each of said buffered fibers having a portion extending from a corresponding one of said locations to a corresponding one of said termini;

a holder that has channel walls forming a plurality of channels that each removably holds a single one of said crimp sleeve assemblies to prevent at least rearward movement of the assembly, whereby a selected one of said optical fiber cables can be easily removed, together with its terminus, from the rest of the cables and corresponding termini;

said channels extend in predetermined forward and rearward directions, said terminus-receiving passages extend primarily perpendicular to said channels, and said channels have proximal ends closest to said passages, said channels and said proximal ends thereof all lying to one side of extensions of said passages, whereby to provide a wide space (110) where said cables under 90° bends.

9. An optical fiber connector that comprises a housing that includes a terminus-holding housing part having a plurality of terminus-receiving passages and a retention clip device within each passage each retention clip device being expandable by a forwardly-inserted tool to release a corresponding terminus so it can be pulled rearwardly out of the passage, the connector also comprising a plurality of termini assemblies that each includes an optic fiber cable that has a fiber, where part of the length of the fiber is surrounded by a strength member that is surrounded by a jacket, the fiber having a front end, the terminus having a bore through which the fiber extends, and the terminus being retained in one of said terminus-receiving passages by one of said retention clip devices, but being removable from the rear of the terminus-holding housing portion, including:

a sleeve assembly lying along each of said cables, each sleeve assembly including a sleeve lying around and fixed to said strength member;

said housing includes a holder that has channel walls forming a plurality of individual channels that each removably holds one of said sleeve assemblies, said channels forming channel shoulders that substantially abut said sleeve assemblies to limit at least their rearward movement along the channel, whereby a selected one of said optical fiber cables and its terminus can be easily replaced;

said channels each have a predetermined length, and a pair of said channel shoulders lies at opposite ends of each channel;

each of said sleeve assemblies includes a pair of metal sleeves lying one within the other and with a strength member of one of said cables between them, the metal sleeves having front and rear opposite ends and being crimped to each other and to said strength member;

each sleeve assembly lies in one of said channels with its opposite ends substantially abutting the channel shoulders at the opposite ends of the channel to prevent the sleeve assemblies from sliding forward or rearward out of the channel;

said holder includes at least one removable cover lying over said channels to provide access to said channels.

10. An optical fiber connector that comprises a housing that includes a terminus-holding housing part having a plurality of terminus-receiving passages and a retention clip device within each passage each retention clip device being expandable by a forwardly-inserted tool to release a corresponding terminus so it can be pulled rearwardly out of the passage, the connector also comprising a plurality of termini assemblies that each includes an optic fiber cable that has a fiber, where part of the length of the fiber is surrounded by a strength member that is surrounded by a jacket, the fiber having a front end, the terminus having a bore through which the fiber extends, and the terminus being retained in one of said terminus-receiving passages by one of said retention clip devices, but being removable from the rear of the terminus-holding housing portion, including:
- a sleeve assembly lying along each of said cables, each sleeve assembly including a sleeve lying around and fixed to said strength member;
- said housing includes a holder that has channel walls forming a plurality of individual channels that each removably holds one of said sleeve assemblies, said channels forming channel shoulders that substantially abut said sleeve assemblies to limit at least their rearward movement along the channel, whereby a selected one of said optical fiber cables and its terminus can be easily replaced;
- each of said sleeve assemblies has a predetermined sleeve length;
- said channels each have a channel length less than said sleeve length;
- each of said sleeve assemblies includes a pair of metal sleeves lying one within the other and with a strength member between them, the metal sleeves having front and rear opposite ends and a middle length between said ends, said middle length being crimped to have a small diameter but said opposite ends not being fully crimped to leave said ends with enlarged diameters that are larger than said small diameter;
- each crimp sleeve assembly lies with its middle length in one of said channels and its opposite ends lying beyond front and rear opposite ends of the channel, each of said channel opposite ends preventing the sleeve assembly from sliding forward or rearward in the channel.

11. The connector described in claim 10 wherein:
- each of said channel walls forms an interrupted channel with opposite channel end walls that each have opposite sides that are biased together but that can be resiliently spread apart to remove a sleeve assembly.

12. An optical fiber connector that comprises a housing that includes a terminus-holding housing part having a plurality of terminus-receiving passages and a retention clip device within each passage each retention clip device being expandable by a forwardly-inserted tool to release a corresponding terminus so it can be pulled rearwardly out of the passage, the connector also comprising a plurality of termini assemblies that each includes an optic fiber cable that has a fiber, where part of the length of the fiber is surrounded by a strength member that is surrounded by a jacket, the fiber having a front end, the terminus having a bore through which the fiber extends, and the terminus being retained in one of said terminus-receiving passages by one of said retention clip devices, but being removable from the rear of the terminus-holding housing portion, including:
- a sleeve assembly lying along each of said cables, each sleeve assembly including a sleeve lying around and fixed to said strength member;
- said housing includes a holder that has channel walls forming a plurality of individual channels that each removably holds one of said sleeve assemblies, said channels forming channel shoulders that substantially abut said sleeve assemblies.

* * * * *